March 16, 1937.  G. M. GRAHAM  2,074,108
WHEEL ALIGNER
Filed Dec. 23, 1935    2 Sheets-Sheet 2
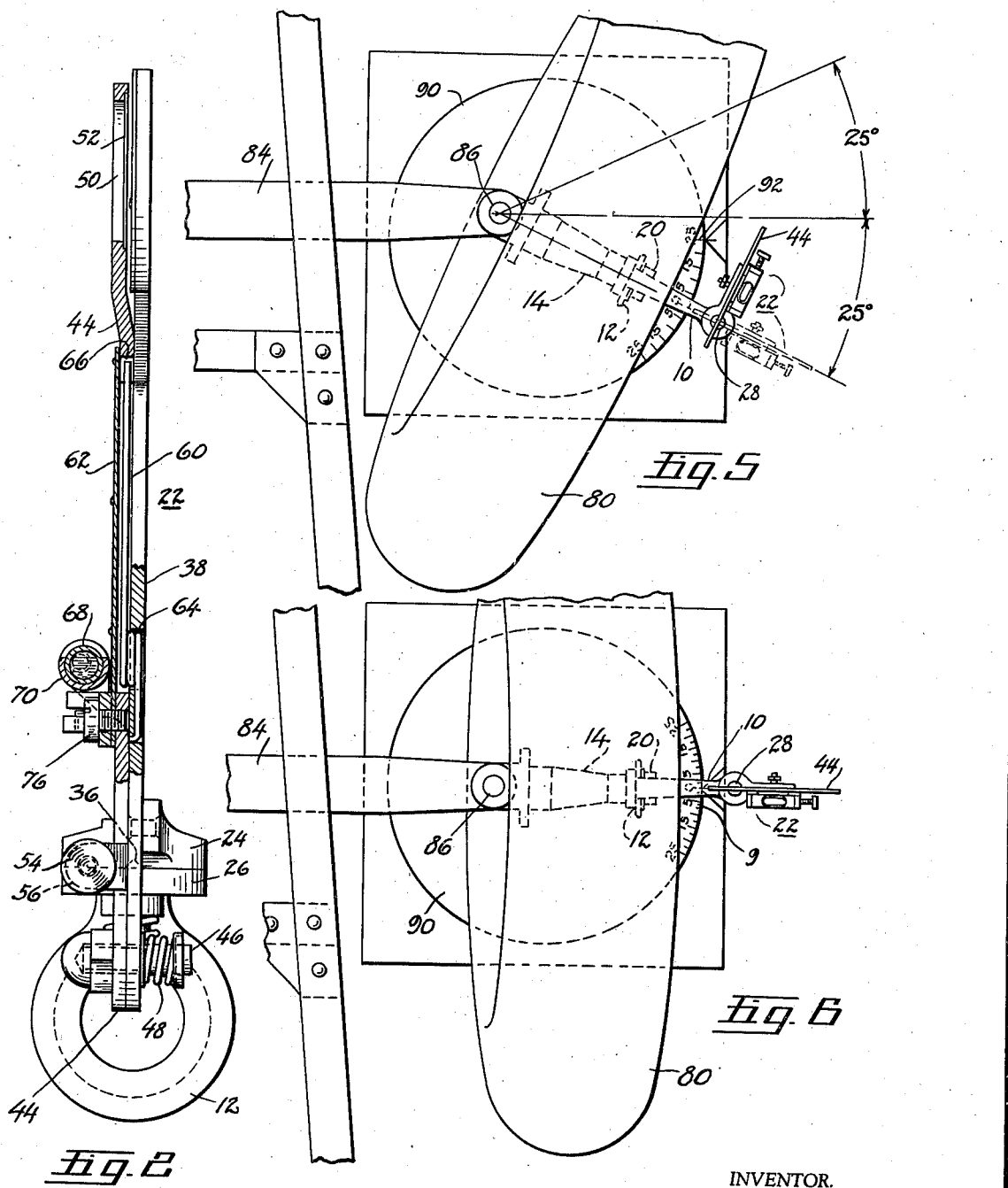
INVENTOR.
George M. Graham
BY
Parker & Burton
ATTORNEYS.

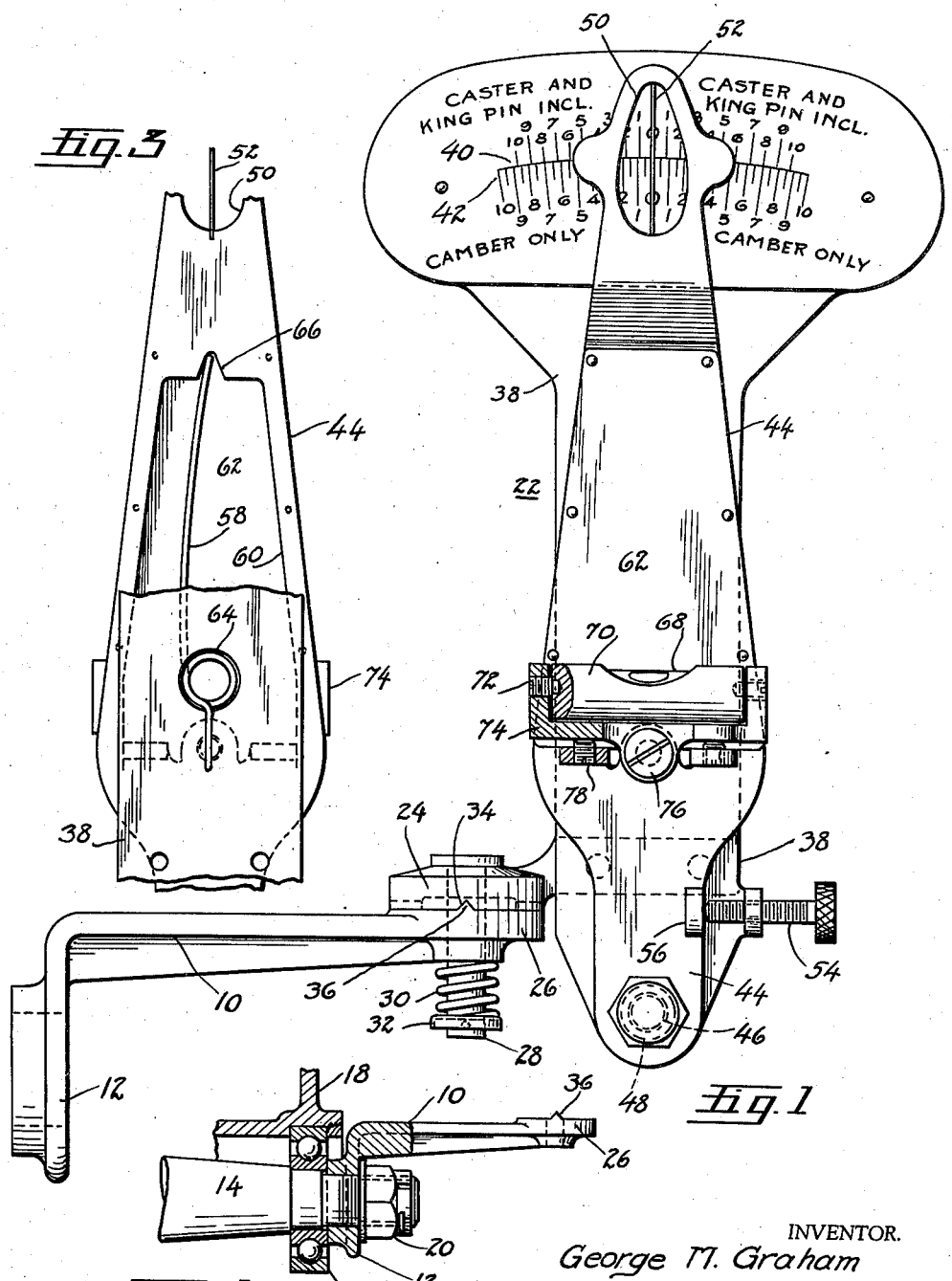

Patented Mar. 16, 1937

2,074,108

UNITED STATES PATENT OFFICE 2,074,108

WHEEL ALIGNER

George M. Graham, Detroit, Mich., assignor to Hinckley-Myers Company, Jackson, Mich., a corporation of Michigan Application December 23, 1935, Serial No. 55,690

14 Claims. (Cl. 33—203)

This invention relates to devices for measuring wheel alignment factors and more particularly to such devices which are adapted to be secured to and supported by the spindle of the wheel which is measured.

An important object of this invention is to provide a compact, strong, neat appearing instrument for measuring the king pin, caster and camber factors of the steering wheel alignment. The device is readily attachable to the spindle of a wheel, and after such securement is easily regulatable for measuring these factors.

A meritorious feature of the invention resides in the novel manner of coupling a gauge to the wheel spindle in order that the gauge may be locked into positions either parallel to or perpendicular to the plane of the wheel. In accomplishing this feature, a novel coupling mechanism is employed which releasably locks the gauge in correct position relative to the wheel for measuring the different factors of wheel alignment. As shown in the illustrated embodiment of this invention, this coupling mechanism automatically functions to lock the gauge in positions either parallel or perpendicular to the plane of the wheel subjected to measurement.

Another meritorious feature of the invention resides in the provision of a single scale on the gauge for measuring both the king pin angle and the caster angle of the swivelling axis about which the wheel to which the gauge is secured is turned. The scale is adapted to measure the king pin angle when turned parallel to the plane of the wheel and to measure the caster angle when turned perpendicular to the plane of the wheel. Another feature of the invention is the provision of a second scale for determining the camber of vehicle wheels, and the provision of a single device or pointer for indicating on each of the scales the particular characteristic of the steering wheels which they are intended to measure.

A further object of this invention is to provide an easily regulatable, strong and self protected mechanism indicating on the sides of the gauge the various factors of wheel alignment. The mechanism comprises a finely adjustable set screw which acts against the tension of a spring to set the pointer at any position on the scales. The spring is protected and well hidden from view providing a neat appearing structure which is not easily damaged.

Various other objects, advantages, and meritorious features of the invention will appear more fully from the following specification, claims and accompanying drawings, wherein:

Figure 1 is a front elevation of the wheel alignment gauge,

Fig. 2 is an end view, partly in cross section, of the device shown in Fig. 1,

Fig. 3 is a fragmentary view of the back of the device, partly broken away, showing the manner of resiliently controlling the movement of the pointer on the gauge, Fig. 4 is a detail cross-sectional view showing the manner of connecting the gauge to the spindle of a vehicle wheel, Fig. 5 is a top view showing a vehicle steering wheel and the manner of connecting the gauge thereto for measuring the king pin angle and the caster angle of the swivelling axis, and Fig. 6 is a top view showing a vehicle steering wheel and the manner of connecting the gauge thereto for measuring the camber of the wheel.

Referring to Fig. 1, the device is provided with a support or arm 10 having a collar 12 disposed perpendicularly to the the arm and adapted to fit upon the wheel spindle 14 as shown in Fig. 4. The bearings 16 are provided for supporting the wheel for rotation, part of which wheel is shown at 18. When the spindle nut 20 is tightened upon the spindle it draws the collar 12 tightly against the wheel bearing 16 so that the arm projects normal to the plane of the bearing or as a linear extension of the spindle.

Arm 10 pivotally supports a gauge generally indicated at 22. The gauge is provided with a laterally extending, circularly shaped bearing surface 24 which is adapted to bear up a similar shaped bearing surface 26 on the arm 10. Pivotally coupling these bearing surfaces together is a vertical pin 28 extending through aligned apertures in the bearing surfaces. The pin is provided with a bead on the upper end for preventing the pin from dropping completely through the apertures. A coil spring 30 tensioned between the arm 10 and a disc 32 secured to the pin, yieldingly draws the bearing surfaces of the pivotal connection together.

The bearing surface of the element 24 is notched at diametrically opposite points as indicated at 34. These notches are preferably spaced ninety degrees apart. The upper bearing surface of the part 26 is shaped with a V-shaped detent 36 which is adapted to seat within the notches 34 and yieldingly lock the gauge in position under tension of spring 30. The detent 36 is formed on the bearing surface at right angles to the longitudinal median line of the arm 10. This permits the gauge to be releasably locked in position either parallel to or perpendicular to the spindle to which the arm is secured. As will appear more fully hereinafter, this will at the same time cause the gauge to take positions either parallel to or perpendicular to the plane of the wheel which is being measured.

The gauge proper comprises an upright member or plate 38 fixedly secured to the bearing element 24. The upper portion of the plate is enlarged and two scales are provided thereon in any suitable manner, such as by etching the scales on a thin sheet of metal and affixing the sheet to plate 38 as shown in the drawings. The upper scale 40 measures both the king pin angle and the caster angle of the axis about which the wheel is swivelled. The lower scale 42 is for the purpose of measuring camber.

A reference indicating member or pointer 44 is pivotally secured to the bottom of plate 38 by a connection which is similar to that for coupling the gauge to arm 10. This connection comprises a pin 46 and a coil spring 48 tensioning the pointer to the gauge plate in the same manner as the spring 30 functions to draw the bearing elements 24 and 26 together. The upper end of the pointer is provided with an oval shaped aperture 50 across which is stretched a thin wire 52. Upon swinging movement of the pointer, the wire 52 is adapted to sweep across both scales 40 and 42 as is apparent in Fig. 1.

A set screw 54 mounted on plate 38 is adapted to bear against a protruding part 56 provided on the pointer for that purpose. Threaded advancement of the set screw will swing the pointer in counterclockwise direction about pin 46.

The pointer is resiliently urged in clockwise direction against the set screw by a spring wire 58 (Figs. 2 and 3). The major portion of this spring wire is mounted within a recess 60 formed in the body of the pointer and normally covered from view by a thin metal sheet 62 secured to the pointer. One end of the spring wire is coiled for several turns and seated in a small circular recess 64 provided in plate 38. The other end of the spring wire bears in a notch 66 formed in the wall of the recess 60. The tension of the wire tends to swing the pointer in clockwise direction as viewed in Fig. 1 and constantly retains the pointer against the set screw. The set screw therefore acts against resilient tension when adjusted.

Approximately midway on the pointer there is provided a spirit level device 68. The glass tube in which the bubble is formed is fitted in a metal cylindrical shell 70 which in turn is adjustably supported at its opposite ends in any suitable manner such as by small set screws 72 carried on bracket 74. Bracket 74 is pivotally secured to pointer 44 by means of a stud or screw 76. The bracket may be adjusted about its pivotal connection by a pair of small set screws 78 threaded in ledges extending beneath the level device on opposite sides of the pivotal connection. By loosening screw 76 and adjusting set screws 78, the position of the level may be varied. This will allow the instrument to be adjusted to zero position after its manufacture and prior to use.

As previously explained, the device is adapted for attachment to the front steering wheels of vehicles for measuring certain swivelling characteristics of the wheel. The views in Figs. 5 and 6 show the positions assumed by the device during the measuring operation. The wheel is generally indicated at 80. It is rotatively mounted about a spindle 14 having a steering knuckle which is yoked in the conventional manner to an axle 84. A pin 86, generally termed a king pin, forms the pivot about which the wheel is turned. The king pin extends downwardly at an inclined angle. It is this angle which causes the wheel to assume various inclinations as it is turned about the king pin.

The forward component of the king pin inclination is termed the "caster angle". Viewed from the side of the vehicle, the caster angle is the amount in degrees of the backward tilt of the axle and the king pin relative to the vertical. The outward component of the king pin inclination is termed the "king pin angle". Viewed from the front of the vehicle, the "king pin angle" is the amount in degrees that the top of the king pin is inclined toward the center of the vehicle.

By camber is meant the outward tilt of the top of the wheel relative to the true vertical. This is caused by downwardly inclining the spindle with respect to the steering knuckle. The purpose of this is to make the contact of the wheel with the ground to coincide as near as possible with the projection of the king pin axis on the ground.

During the measurement of these three wheel aligning characteristics, it is preferred that the wheel be mounted upon a turntable or slip plate 90 which is adapted to measure by means of a scale 92 the amount of wheel turn. The gauge is secured to the wheel spindle by removing the spindle nut 20, slipping the collar 12 over the spindle, and resecuring the spindle tightly therebehind so as to draw the collar against the outside wheel bearing 16.

To measure camber, the wheel is fixed straight ahead and the gauge plate 38 is turned and releasably locked in position perpendicular to the plane of the wheel. This position is shown in Fig. 6. The set screw 54 is adjusted until the bubble in the level is centered. The position of the cross wire 52 on the camber scale 42 indicates the amount of camber. In making this measurement the floor should be level.

To measure the caster angle, the wheel is turned out a predetermined amount, for example, twenty-five degrees for which the caster scale has been calibrated. The plate 38 is retained in the same position previously set for measuring the camber, that is, parallel with the spindle. The set screw 54 is adjusted until the bubble is centered and the caster scale reading is noted. The wheel is now turned in twenty-five degrees from its straight ahead position and the bubble centered by adjusting the set screw. The caster angle will be the amount of pointer travel across scale 40 from the first reading.

To measure the king pin angle, the wheel is turned out twenty-five degrees. The gauge plate 38 is turned until it is sprung into locking position parallel with the plane of the wheel as shown in Fig. 5. With the pointer on gauge set at zero, the gauge is turned on the spindle until the bubble in the level is centered. The spindle nut may be loosened temporarily for this step. The wheel is now turned in twenty-five degrees from its straight ahead position and the pointer is again adjusted until the bubble in the level is centered. The amount of king pin inclination is read from scale 40 at this point.

What I claim is:

1. A wheel measuring device for testing wheel alignment comprising, in combination, a gauge plate, a support for attaching said gauge plate to a spindle of a vehicle wheel, a member carried by said gauge plate and swingable over a face thereof, a bubble level carried by said member, means for adjusting said member relative to said gauge plate, means pivotally connecting said gauge plate to said support under tension of a spring, said connecting means including means for releasably locking said gauge plate in certain positions of its pivotal movement at right angles to one another.

2. A wheel alignment measuring device comprising, in combination, a support adapted to be secured to the end of a wheel spindle, a gauge, means for pivotally connecting said gauge to said support, means cooperating between said gauge and said support operable to releasably lock the gauge in positions either parallel to or perpendicular to the spindle to which the support is attached, reference indicating means carried by said gauge and mounted for swinging movement relative thereto, means resiliently urging said indicating means in one direction of its swingable movement, and means carried by said gauge for adjusting said indicating means against the tension of said resilient means.

3. A wheel aligning device for measuring the swivelling characteristics of vehicle steering wheels comprising, in combination, a support arranged for attachment to a part of a vehicle wheel structure, an instrument for measuring the swivelling characteristics of steering wheels, means connecting said instrument to said support for rotary movement thereon including a spring yieldingly drawing the instrument and the support into close engagement, and means on said instrument and said support adapted to automatically releasably lock said instrument in two positions at right angles to each other.

4. A support for coupling a wheel measuring gauge to the spindle of a wheel comprising an arm attachable at one end to the spindle of a wheel, means on said arm for connecting a gauge thereto under tension of a spring for rotary movement thereon, and means for releasably locking said gauge to said arm under tension of said spring in positions either parallel to or perpendicular to the plane of the wheel to which the arm is attached.

5. A wheel aligning device comprising, in combination, a gauge, a member for connecting said gauge to a vehicle wheel element for measuring the alignment of the wheel, means on said member supporting said gauge for pivotal movement, and means for automatically locking said gauge in predetermined positions in its pivotal movement, said locking means adapted to release said gauge for pivotal movement when relatively strong forces are exerted tending to pivot said gauge about its connection to said member.

6. A wheel aligner gauge comprising, in combination, a plate provided on one surface with a scale for measuring both the king pin inclination and the caster inclination of a vehicle steering wheel and a second scale for measuring the camber inclination of steering wheel, a pointer carried by said plate and arranged to swing over said scales, a level carried by said pointer, means for adjusting said pointer relative to said plate, and means for pivotally securing said plate to the spindle of a steering wheel, means for releasably locking the plate against pivotal movement in position either parallel to or perpendicular to the plane of the wheel, said combined caster and king pin scale adapted to measure the king pin inclination of the steering axis when the plate is parallel to the plane of the wheel and to measure the caster inclination when the plate is perpendicular thereto.

7. A wheel aligning device comprising, in combination, a gauge for determining various angular characteristics of steering axes of vehicle wheels, an arm pivotally supporting said gauge, said arm provided with a collar extending in a plane perpendicular thereto and being of a size to fit on the spindle of the wheel after the removal of the spindle nut normally secured thereon, said collar being shaped to bear against the outside wheel bearing in the spindle when the collar is tightened thereagainst by re-securing and tightening the spindle nut upon the spindle.

8. A wheel aligning device comprising, in combination, an arm attachable to the end of a wheel spindle, a plate pivotally connected to said arm and adapted to be pivoted to positions either parallel to or perpendicular to the plane of the wheel to which the arm is secured, a member pivotally secured to said plate for swinging movement across and closely adjacent a surface thereof, a set screw carried by said plate arranged to engage said member and swing the same relative to the plate, said member having a recess, and a coil spring positioned in said recess having one end thereof connected to said member and the other end connected to said plate, said spring arranged to yieldingly urge said member against said set screw to follow the adjustment determined by the latter.

9. A wheel aligning device comprising, in combination, an arm apertured at one end for securement upon the spindle of a vehicle wheel to form a linear extension thereof and apertured at the other end for receiving a coupling pin arranged to pivotally support a gauge element, and means associated with said coupling pin for releasably locking said gauge element in predetermined angular positions with respect to said arm.

10. A wheel aligning measuring device comprising, in combination, a gauge for determining various angular characteristics of the steering axis of a vehicle wheel, an arm adapted to be secured to the wheel which is to be measured, said arm carrying an upright pin, said gauge journaled upon said pin for swinging movement relative to said arm and the wheel, and means for releasably locking said gauge in predetermined positions in its swinging movement.

11. A wheel aligning measuring device comprising, in combination, a member adapted to be secured to a wheel, a gauge member journaled to said first member for swinging movement relative to the same, said members having abutting bearing surfaces adjacent to the journal connection therebetween, and means on one of said bearing surfaces adapted to engage with cooperating means on the other bearing surface to releasably lock said gauge member in certain predetermined positions in its swinging movement.

12. A wheel aligning device for measuring the swivelling characteristics of vehicle steering wheels comprising, in combination, a support arranged for attachment to a part of a vehicle wheel structure, an instrument for measuring certain swivelling characteristics of vehicle steering wheels, means pivotally connecting said instrument to said support including a pivot pin about which said instrument is journaled and a spring coiled about said pin acting to yieldingly draw the instrument and the support into close engagement, and means for releasably locking said instrument to said support under tension of said spring in two positions at right angles to each other.

13. A wheel aligning measuring device comprising, in combination, a member adapted to be secured to a wheel and provided with a protruding pivot pin, a gauge member journaled to said pivot for swinging movement relative to the same, said gauge member and said supporting member having abutting surfaces adjacent to said pivot pin, means on one of said surfaces adapted to engage with cooperating means on the other of said surfaces to releasably lock said gauge member in certain predetermined positions in its swinging movement, and a compressed coiled spring encircling said pivot pin and acting to yieldingly maintain said surfaces in abutting relationship.

14. A wheel aligning device comprising, in combination, a gauge, a member for connecting said gauge to a vehicle wheel element for measuring the alignment of the wheel, a vertical pin on said member, said gauge journaled about said pin for swinging movement in a horizontal plane, and means for automatically locking said gauge in certain predetermined positions in its swinging movement, said locking means adapted to release said gauge for swinging movement when relatively strong forces are exerted tending to swing said gauge about said pin.

GEORGE M. GRAHAM.